US012619296B2

(12) United States Patent
Norris et al.

(10) Patent No.: US 12,619,296 B2
(45) Date of Patent: May 5, 2026

(54) SENSOR EMULATION

(71) Applicant: APPLE INC., Cupertino, CA (US)

(72) Inventors: Jeffrey S. Norris, Saratoga, CA (US); Bruno M. Sommer, Sunnyvale, CA (US); Olivier Gutknecht, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 18/124,787

(22) Filed: Mar. 22, 2023

(65) Prior Publication Data

US 2023/0288701 A1 Sep. 14, 2023

Related U.S. Application Data

(63) Continuation of application No. PCT/US2021/049207, filed on Sep. 7, 2021.

(60) Provisional application No. 63/083,188, filed on Sep. 25, 2020.

(51) Int. Cl.

| | |
|---|---|
| *G06F 3/01* | (2006.01) |
| *G06T 13/40* | (2011.01) |
| *G06T 19/00* | (2011.01) |
| *H04N 23/13* | (2023.01) |
| *H04N 23/57* | (2023.01) |
| *H04N 23/63* | (2023.01) |

(52) U.S. Cl.
CPC ............ *G06F 3/011* (2013.01); *G06T 19/006* (2013.01); *H04N 23/13* (2023.01); *H04N 23/57* (2023.01); *H04N 23/632* (2023.01); *G06T 13/40* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 9,667,850 B2 | 5/2017 | Kim et al. | |
| 10,276,210 B2 * | 4/2019 | Cole ...................... | G06T 19/20 |
| 10,445,925 B2 | 10/2019 | Tokubo | |
| 10,754,496 B2 | 8/2020 | Kiemele et al. | |

(Continued)

OTHER PUBLICATIONS (PCT) European Patent Office (ISA/EP), International Search Report and Written Opinion of the International Searching Authority, International Application No. PCT/US2021/049207, 11 pages, Jan. 5, 2022.

(Continued)

*Primary Examiner* — Frank S Chen

(74) *Attorney, Agent, or Firm* — Thompson Hine LLP

(57) ABSTRACT

Various implementations disclosed herein include devices, systems, and methods that are capable of executing an application on a head-mounted device (HMD) having a first image sensor in a first image sensor configuration. In some implementations, the application is configured for execution on a device including a second image sensor in a second image sensor configuration different than the first image sensor configuration. In some implementations, a request is received from the executing application for image data from the second image sensor. Responsive to the request at the HMD, a pose of a virtual image sensor is determined, image data is generated based on the pose of the virtual image sensor, and the generated image data is provided to the executing application.

25 Claims, 9 Drawing Sheets

(56) References Cited

U.S. PATENT DOCUMENTS

| | | | | |
|---|---|---|---|---|
| 2017/0269713 | A1* | 9/2017 | Marks | A63F 13/86 |
| 2017/0357312 | A1* | 12/2017 | Raum | G06F 3/013 |
| 2018/0095635 | A1* | 4/2018 | Valdivia | G02B 27/0093 |
| 2020/0070051 | A1 | 3/2020 | Frappiea | |
| 2022/0230399 | A1* | 7/2022 | Evangelista | G06T 15/20 |

OTHER PUBLICATIONS

Inamoto, N. et al., "Free Viewpoint Video Synthesis and Presentation of Sporting Events for Mixed Reality Entertainment," Proceedings of the 2004 ACM SIGCHI International Conference on Advances in Computer Entertainment, pp. 42-50, Sep. 2, 2004.
Okura, F. et al., "Teleoperation of Mobile Robots by Generating Augmented Free-viewpoint Images," 2013 IEEE/RSJ International Conference on Intelligent Robots and Systems (IROS), pp. 665-671, Nov. 3, 2013.
Oyama, E. et al., Hybrid Head Mounted/Surround Display for Telexistence/Telepresence and Behavior Navigation, 2013 IEEE International Symposium on Safety, Security, and Rescue Robotics, (SSRR), IEEE, 6 pages, Oct. 21, 2013.

* cited by examiner

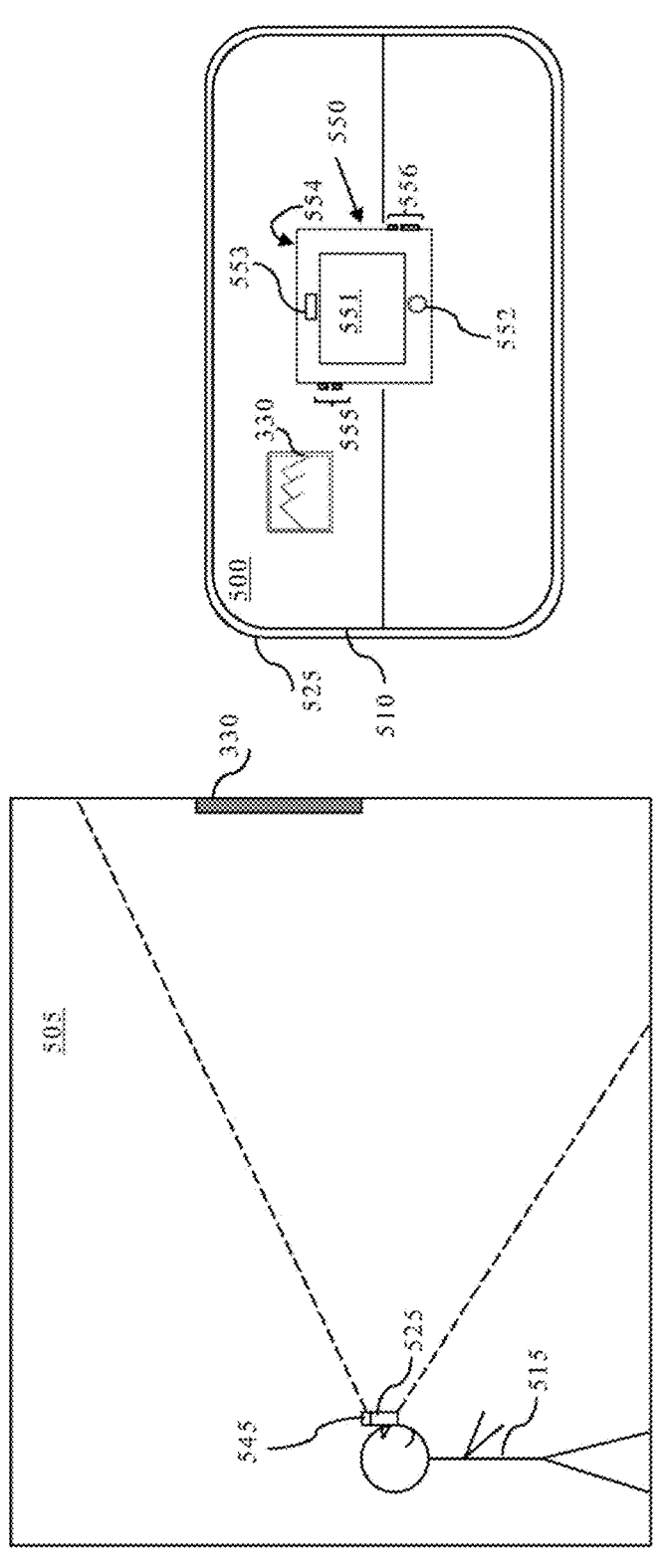
FIGURE 5

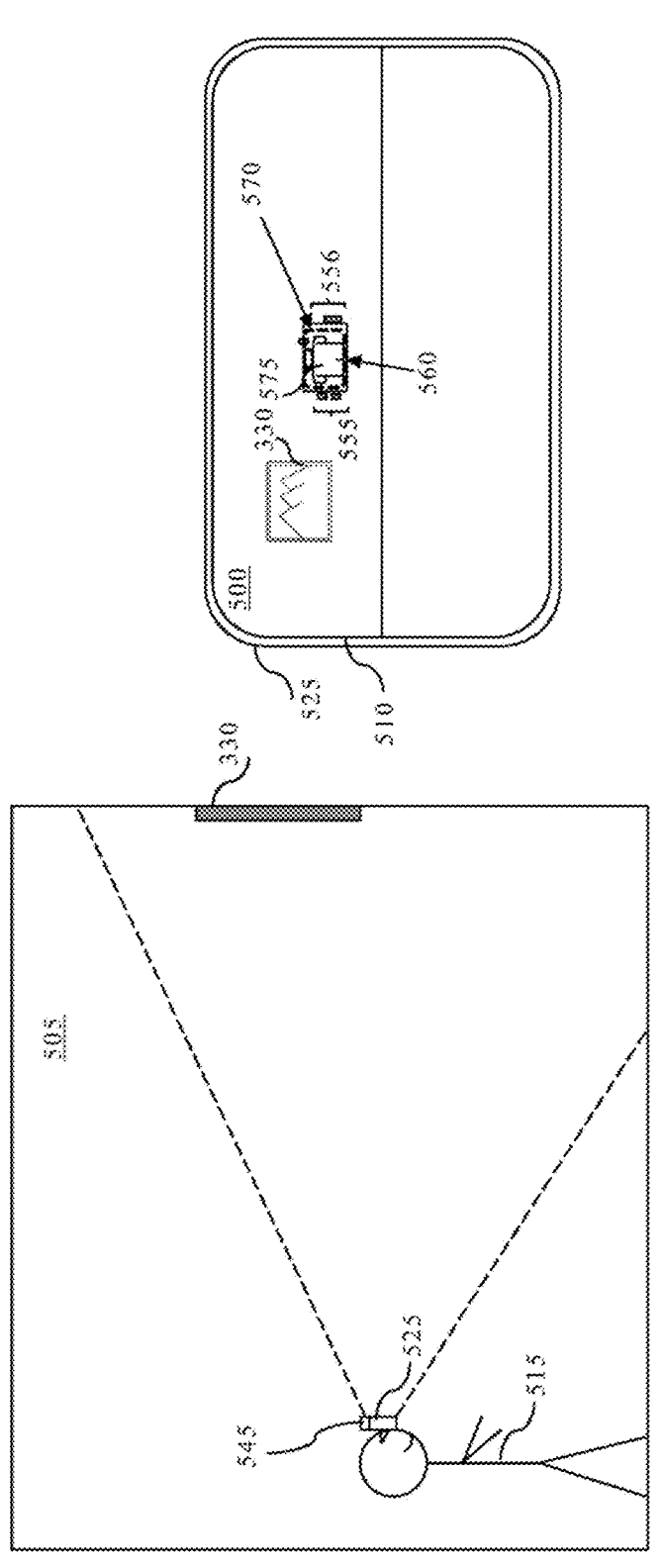
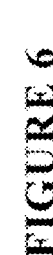
FIGURE 6

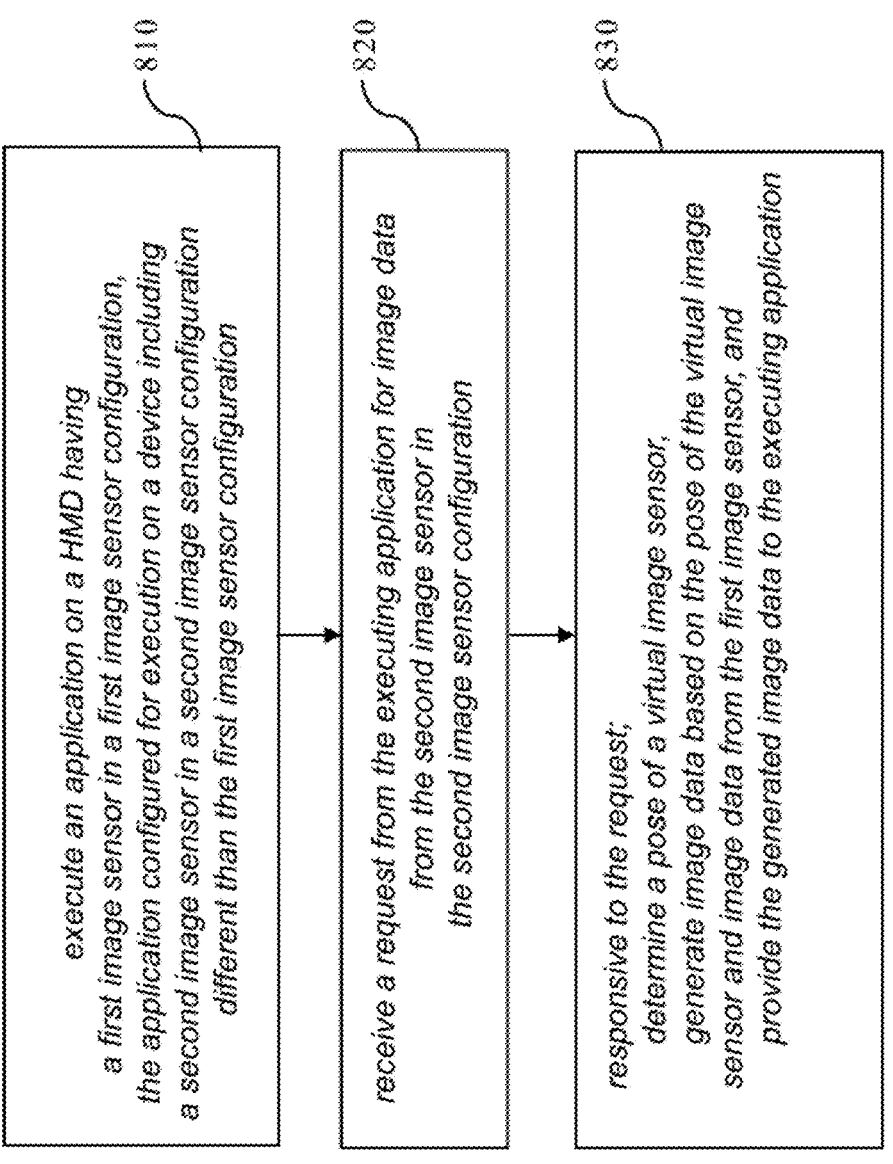

810 execute an application on a HMD having
a first image sensor in a first image sensor configuration,
the application configured for execution on a device including
a second image sensor in a second image sensor configuration
different than the first image sensor configuration

820 receive a request from the executing application for image data
from the second image sensor in
the second image sensor configuration

830 responsive to the request,
determine a pose of a virtual image sensor,
generate image data based on the pose of the virtual image
sensor and image data from the first image sensor, and
provide the generated image data to the executing application

*FIGURE 8*

SENSOR EMULATION

CROSS-REFERENCE TO RELATED APPLICATIONS

This application is a continuation of International Application No. PCT/US2021/049207 filed on Sep. 7, 2021, which claims the benefit of U.S. Provisional Application No. 63/083,188 filed on Sep. 25, 2020, both entitled "SENSOR EMULATION," each of which is incorporated herein by this reference in its entirety.

TECHNICAL FIELD

The present disclosure generally relates to providing image content on electronic devices and, in particular, to systems, methods, and devices that provide images based on image sensor emulation.

BACKGROUND

Electronic devices have different configurations of image sensors. For example, mobile devices intended generally for use from a few inches to a few feet in front of a user's face may have a front-facing camera intended to capture images of the user while the user is using the device. Other devices that are not intended for use in the same way, such as head-mounted devices (HMDs) may not have front-facing cameras that capture similar images of users. Applications designed for execution on a first type of device may be executed (e.g., via an emulator) on another type of device. However, the application's requests and other interactions with images sensors may not provide desirable results based on differences in the configurations between the different types of devices. For example, requests for images from a front-facing camera expected to be facing a user from a few inches to a few feet in front of the user may not provide desirable results in the circumstance in which the application is being emulated on a device, e.g., an HMD, that does not have a front-facing camera used in that way.

SUMMARY

Various implementations disclosed herein include devices, systems, and methods that execute (e.g., via an emulator) an application on a device having a first image sensor configuration where the application is intended for a device having a second image sensor configuration. For example, the application may be intended for execution on a mobile device having a front-facing camera that is generally used a few inches to a few feet in front of the user and facing the user, and may be used on a device that has a different image sensor configuration such as a device not having a front-facing camera intended to be used a few inches to a few feet in front of the user and facing the user. In some implementations, such execution involves responding to the application's requests for front-facing and rear-facing camera feeds by modifying the executing device's own image sensor data according to a virtual image sensor pose. For example, an application may include a request for a front-facing camera feed of a mobile device and a response may be provided to such a request on a device having a different image sensor configuration by emulating a front-facing image sensor feed. In one example, this involves providing a selfie view of a representation of the user from a viewpoint a few inches to a few feet in front of the user and facing the user. In another example, an application may request a mobile device's rear-facing camera feed and a response may be provided by providing a view of the environment from a position of a virtual device that is a few inches to a few feet in front of the user and facing away from the user.

Various implementations disclosed herein include devices, systems, and methods that implement a virtual second image sensor in a second different image sensor configuration on a device having a first image sensor in a first image sensor configuration. In some implementations, an HMD that includes outward, inward, or downward image sensors implements a virtual front-facing image sensor or a virtual rear-facing image sensor to generate front-facing image sensor data or rear-facing image sensor data for an application being executed on the HMD. In some implementations, the HMD responds to requests from an executing application for front-facing and rear-facing camera feeds by modifying the HMD's image sensor data according to a virtual image sensor pose. For example, the HMD may emulate a front-facing device camera to provide a "selfie" view of a representation of the HMD user, e.g., a photo-realistic avatar. In another example, the HMD may emulate a rear-facing device camera to provide an image sensor feed of the physical environment or extended reality (XR) environment from a position of a virtual image sensor that is a few feet in front of the HMD user. In some implementations, the image sensor feed may be a still image, series of images, video, etc.

In some implementations, the HMD executes an application that asks for the front-facing camera feed that is generally available on a smartphone, a tablet, or the like. In this situation, the HMD may automatically create a virtual image sensor in a XR environment (e.g., MR, VR, etc.) that provides a selfie picture or streams a selfie view of the HMD user's avatar for that application. In some implementations, the virtual front-facing image sensor appears to the HMD user as a 3D model of a camera positioned in front of the HMD user in the XR environment that the HMD user may freely position (e.g., in 3D space) around the HMD user. In some implementations, the 3D model of the virtual camera floats in front of the HMD user and is presented with its own attached preview so that the HMD user knows or views what the floating 3D camera model is "seeing". In some implementations, the HMD downloads the application from an online or cloud application store and executes the application without modification.

In some implementations, a method includes executing an application on a head-mounted device (HMD) having a first image sensor in a first image sensor configuration, the application configured for execution on a device including a second image sensor in a second image sensor configuration different than the first image sensor configuration. In some implementations, a request is received from the executing application for image data from the second image sensor in the second image sensor configuration. In some implementations, responsive to the request, a pose of a virtual image sensor is determined, image data is generated based on the pose of the virtual image sensor and image data from the first image sensor, and the generated image data is provided to the executing application.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5-7 are diagrams that show a XR environment including a 3D representation of a virtual image sensor based on a physical environment in accordance with some implementations.

FIG. 8 is a flowchart illustrating an exemplary method of generating image data for a second image sensor in a second different image sensor configuration on a HMD having a first image sensor in a first image sensor configuration in accordance with some implementations.

Figure 1:
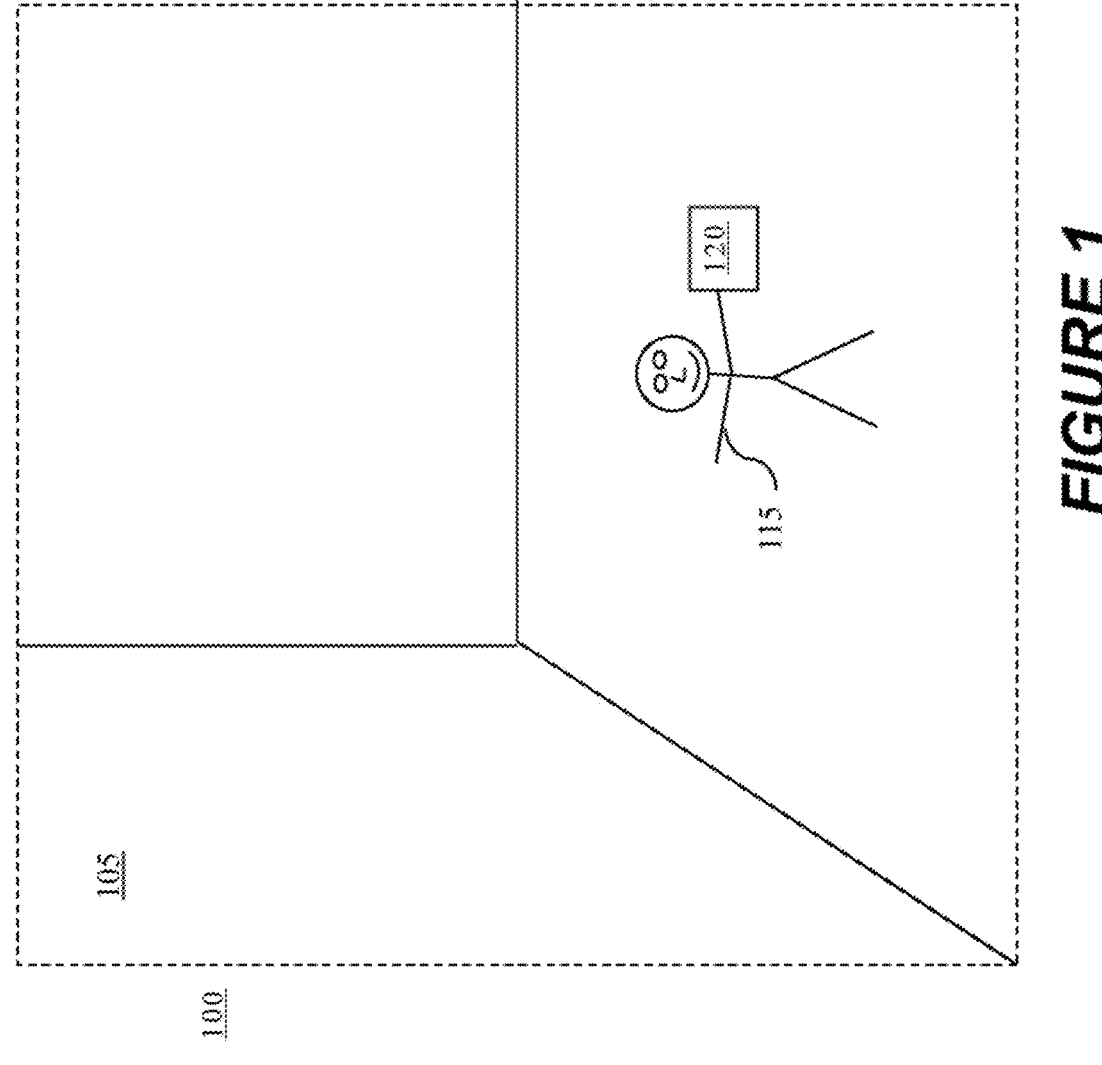
FIG. 1 is a diagram of an example operating environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example operating environment 100 in which electronic device 120 is used in physical environment 105. A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell.

In the example of FIG. 1, the device 120 is illustrated as a single device. Some implementations of the device 120 are hand-held. For example, the device 120 may be a mobile phone, a tablet, a laptop, and so forth. In some implementations, the device 120 is worn by a user. For example, the device 120 may be a watch, a HMD, and so forth. In some implementations, functions of the device 120 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 120 may communicate with one another via wired or wireless communications.

In some implementations, the device 120 is configured to manage and coordinate a XR environment for the user 115. In some implementations, a HMD including a first image sensor in a first image sensor configuration uses image data from the first image sensor to generate image data corresponding to a second image sensor in a second different image sensor configuration.

According to some implementations, the electronic device 120 presents a XR environment to the user 115 while the user 115 is present within the physical environment 105. A person can use an electronic device 120 to interact with and/or sense an XR environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Figure 2:
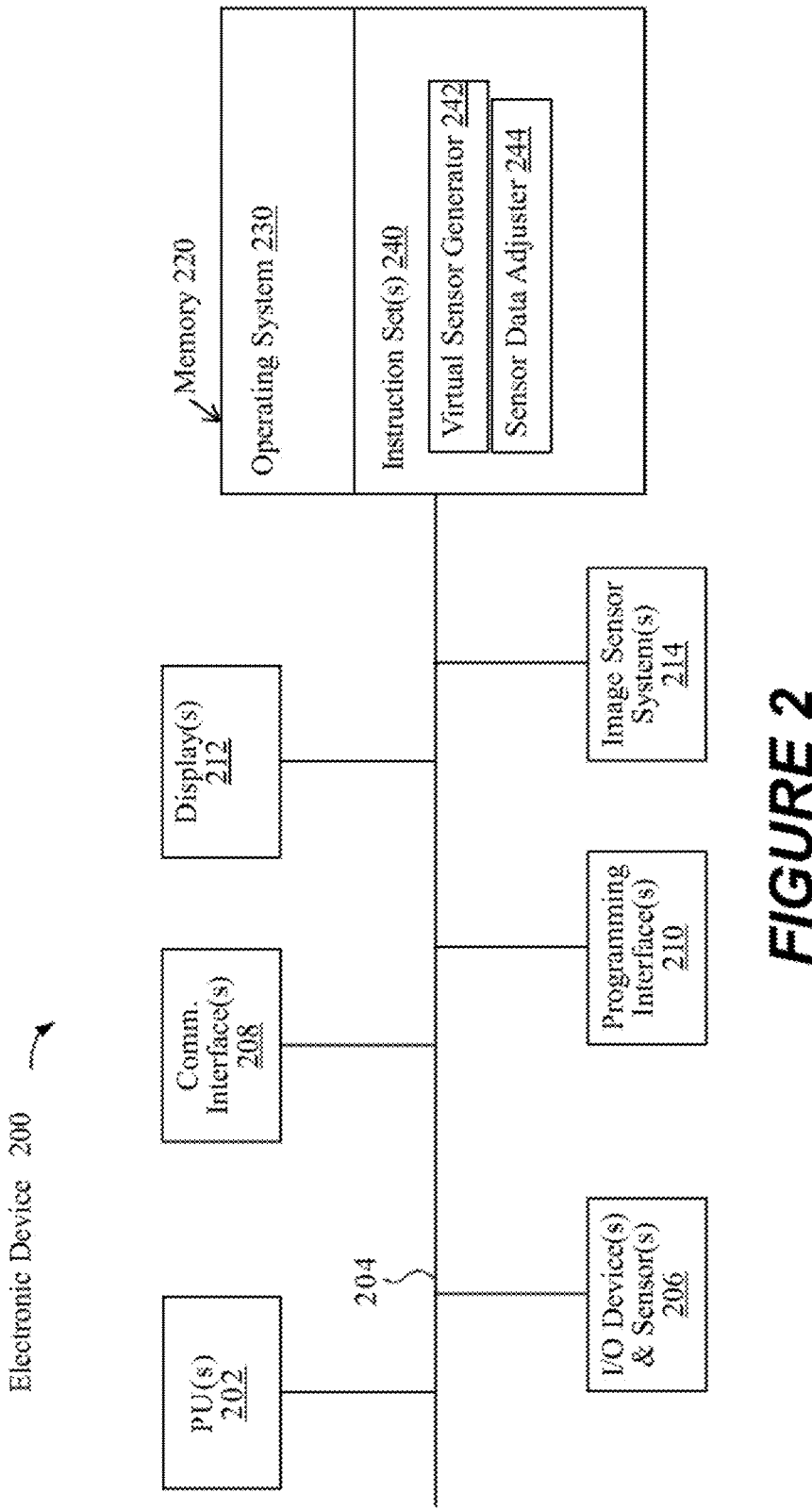
FIG. 2 is a diagram of an example electronic device in accordance with some implementations.

FIG. 2 is a block diagram of an example device 200. Device 200 illustrates an exemplary device configuration for the device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 200 includes one or more processing units 202 (e.g., microprocessors, ASICs, FPGAs, GPUs, CPUs, processing cores, or the like), one or more input/output (I/O) devices and sensors 206, one or more communication interfaces 208 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 210, one or more displays 212, one or more interior or exterior facing sensor systems 214, a memory 220, and one or more communication buses 204 for interconnecting these and various other components.

In some implementations, the one or more communication buses 204 include circuitry that interconnects and controls communications between system components. In some implementations, the one or more I/O devices and sensors 206 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more micro-phones, one or more speakers, a haptics engine, one or more depth sensors (e.g., a structured light, a time-of-flight, or the like), or the like.

In some implementations, the one or more displays 212 are configured to present content to the user. In some implementations, the one or more displays 212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 212 correspond to diffractive, reflective, polarized, holographic, etc. wave-guide displays. For example, the electronic device 200 may include a single display. In another example, the electronic device 200 includes a display for each eye of the user.

In some implementations, the one or more interior or exterior facing sensor systems 214 include an image capture device or array that captures image data or an audio capture device or array (e.g., microphone) that captures audio data. The one or more image sensor systems 214 may include one or more RGB cameras (e.g., with a complimentary metal-oxide-semiconductor (CMOS) image sensor or a charge-coupled device (CCD) image sensor), monochrome cam-eras, IR cameras, event-based cameras, or the like. In various implementations, the one or more image sensor systems 214 further include an illumination source that emits light such as a flash. In some implementations, the one or more image sensor systems 214 further include an on-camera image signal processor (ISP) configured to execute a plurality of processing operations on the image data.

The memory 220 includes high-speed random-access memory, such as DRAM, SRAM, DDR RAM, or other random-access solid-state memory devices. In some imple-mentations, the memory 220 includes non-volatile memory, such as one or more magnetic disk storage devices, optical disk storage devices, flash memory devices, or other non-volatile solid-state storage devices. The memory 220 option-ally includes one or more storage devices remotely located from the one or more processing units 202. The memory 220 comprises a non-transitory computer readable storage medium.

In some implementations, the memory 220 or the non-transitory computer readable storage medium of the memory 220 stores an optional operating system 230 and one or more instruction set(s) 240. The operating system 230 includes procedures for handling various basic system services and for performing hardware dependent tasks. In some imple-mentations, the instruction set(s) 240 include executable software defined by binary information stored in the form of electrical charge. In some implementations, the instruction set(s) 240 are software that is executable by the one or more processing units 202 to carry out one or more of the techniques described herein.

In some implementations, the instruction set(s) 240 include a virtual sensor generator 242 that is executable by the processing unit(s) 202 to determine characteristics of a sensor type of a given electronic device according to one or more of the techniques disclosed herein. In some implemen-tations, the virtual sensor generator 242 is executed to determine a pose and data output by requested image sensor type, for example, by a front-facing or rear-facing RGB or RGB-D image sensor for a mobile electronic device.

In some implementations, the instruction set(s) 240 include a sensor data adjuster 244 that is executable by the processing unit(s) 202 to generate image data to correspond to a different sensor type or configuration according to one or more of the techniques disclosed herein. In some imple-mentations, the sensor data adjuster 244 modifies data from the interior or exterior facing sensor systems 214 or the sensors 206 to generate the image data corresponding to a virtual image sensor (e.g., different sensor type or configu-ration) according to one or more of the techniques disclosed herein. In some implementations, the sensor data adjuster 244 is executed to modify image or depth data of the physical environment captured, for example, by the interior or exterior facing sensor systems 214 to provide image or depth data according to the characteristics and current pose of a different sensor type virtually positioned in a corre-sponding XR environment.

Although the instruction set(s) 240 are shown as residing on a single device, it should be understood that in other implementations, any combination of the elements may be located in separate computing devices. FIG. 2 is intended more as a functional description of the various features which are present in a particular implementation as opposed to a structural schematic of the implementations described herein. As recognized by those of ordinary skill in the art, items shown separately could be combined and some items could be separated. For example, actual number of instruc-tion sets and the division of particular functions and how features are allocated among them will vary from one implementation to another and, in some implementations, depends in part on the particular combination of hardware, software, or firmware chosen for a particular implementa-tion.

Various implementations disclosed herein include devices, systems, and methods that generate data corre-sponding to a second image sensor in a second different image sensor configuration on a HMD having a first image sensor in a first image sensor configuration. In some imple-mentations, the HMD uses outward, inward, or downward image sensor data to generate data corresponding to a front-facing image sensor or a rear-facing image sensor for an application being executed on the HMD. In some implementations, the HMD responds to the requests for front-facing and rear-facing image sensor (e.g., camera) feeds by modifying the image sensor data of the HMD according to a virtual image sensor pose. For example, the HMD may emulate a front-facing device image sensor (e.g., an image sensor on a display-side of a smartphone, a tablet, or the like) to provide a "selfie" view of a representation of the HMD user, e.g., a photo-realistic avatar. In another example, the HMD may emulate a rear-facing device image sensor (e.g., an image sensor opposite the display-side of a smartphone, a tablet, or the like) to provide a view of the environment from a position of a virtual image sensor that is a few feet in front of the HMD user. In some implementations, the image sensor feed may be a still image, series of images, video, etc.

In some implementations, the HMD executes an application that asks for the front-facing image sensor feed that is generally available on a smartphone, a tablet, or the like. In this situation, the HMD may automatically create a virtual image sensor in a XR environment that provides a selfie picture or streams a selfie view of the HMD user's avatar into the application instead. In some implementations, the virtual image sensor appears to the HMD user as a 3D model of an image sensor floating in front of them in a XR environment that the HMD user may freely position (e.g., in 3D space) around the HMD user. In some implementations, the 3D model of the image sensor floating in front of the HMD user in the XR environment is presented with its own attached preview so that the HMD user knows or views what the floating 3D image sensor model is "seeing". In some implementations, the HMD downloads the application from an online or cloud application store. In some implementations, the HMD downloads the application from an online or cloud application store and executes the application without modification.

In some implementations, the HMD front-facing virtual image sensor can be automatically controlled by a hardware or software operating at the HMD so that when the HMD user (e.g., avatar) selects, looks, or points at something in the HMD user's XR environment, the front-facing virtual image sensor could zoom out or otherwise adjust the image sensor feed to capture the avatar along with whatever is selected, viewed, or pointed at.

In some implementations, the HMD executes an application that asks for a rear-facing image sensor that is generally available on a smartphone, a tablet, mobile electronic device, or the like. In this situation, the HMD may provide a perspective of the virtual image sensor including any virtual content the virtual image sensor sees, or the HMD may provide the application an image sensor feed that shows the opposite direction of the virtual front-facing image sensor (e.g., selfie view of the HMD user's avatar) described above. In some implementations when the application requests the rear-facing image sensor, the HMD may provide the equivalent of a handheld image sensor in a XR environment. In some implementations when the application requests the rear-facing image sensor that is aligned with a ray emanating from the HMD user's head (or from an outward-facing image sensor of the HMD), the HMD may provide an image sensor feed that shows video passthrough. In some implementations when the application requests the rear-facing image sensor that is not aligned with a ray emanating from the HMD user's head, the HMD may provide image data that shows the virtual content in a scene or the XR environment.

For example, when the HMD executes a video conferencing application, the HMD user would appear in the video call as the avatar of the HMD user. In some implementations in the video conferencing application, the HMD user could also show other people on the video conferencing call the avatar of the HMD user in a physical environment and any virtual content that the HMD user is using or viewing in the XR environment. In some implementations in different applications (e.g., the video conferencing application), the avatar of the HMD user may be lip synchronized to the corresponding audio. In some implementations in different applications, the avatar of the HMD user may be photo-realistic.

In another example, when the HMD executes a social media application, the HMD user may "take a picture' or 'take a video' of what the HMD user sees in the XR environment, or take a selfie of the HMD user amidst the XR environment and post the picture/video to the corresponding social media service/site or a remotely accessible service/site in which the HMD user is enrolled. In some implementations, the picture or video may have filters, etc. applied before being uploaded. In some implementations, the HMD may execute stand-alone image filtering applications (e.g., cosmetic modeling applications, caricature applications, etc.).

In yet another example, when the HMD executes various applications that ask for front-facing or rear-facing image sensor streams, each application may be implemented using a default perspective, which may subsequently be manually or automatically adjusted (e.g., by the HMD user).

In some implementations, the virtual image sensor representing any of the requested image sensors (e.g., front-facing image sensor, rear-facing image sensor, or the like) may be used to generate image data containing image data captured by a physical image sensor of the HMD, a modified version of the image data captured by the physical image sensor of the HMD, virtual content from the XR environment, or a combination thereof from the perspective of the virtual image sensor.

Figure 3:
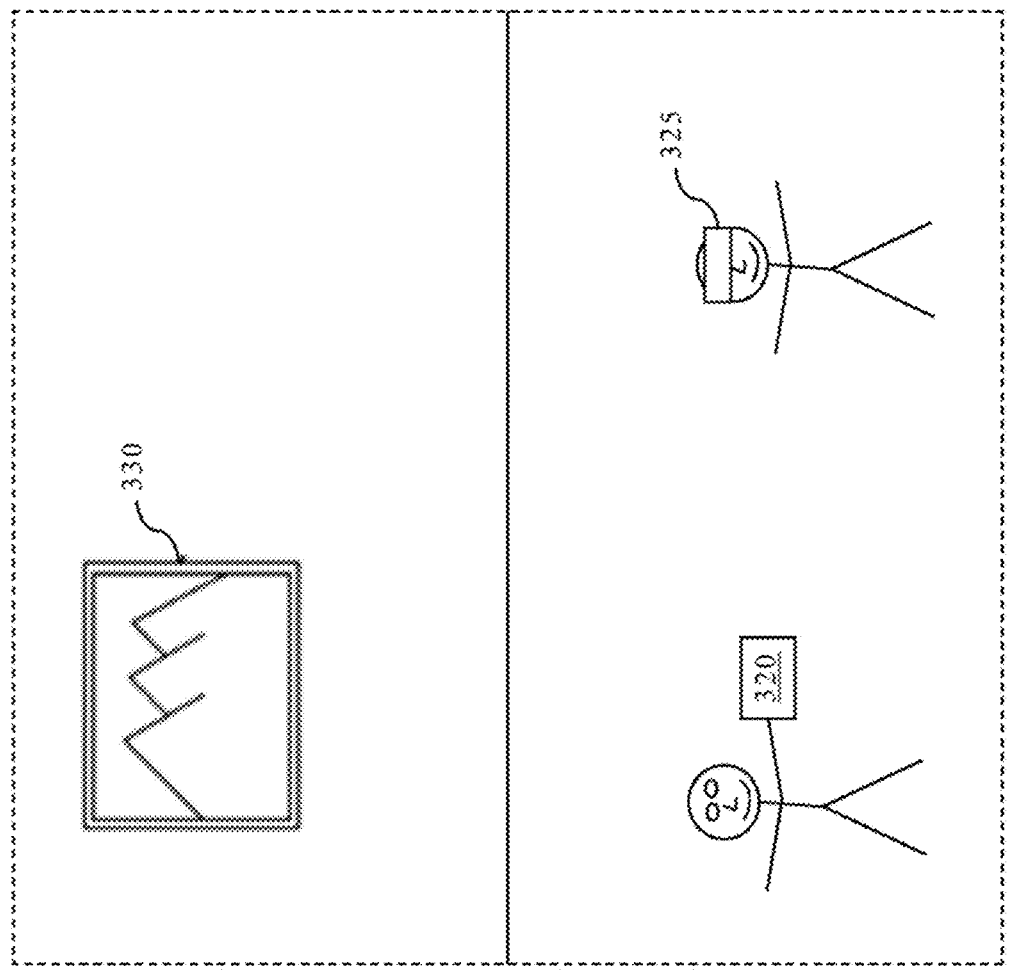
FIG. 3 is a block diagram showing an example environment.

Referring to FIG. 3, a physical environment 305 includes a first electronic device 320 being used by a first user and a second electronic device 325 being used by a second user. In this example, the environment 305 is a room that includes picture 330. The two devices 320, 325 can operate alone or interact with additional devices not shown to capture images of the environment, detect or track objects in those images, or to present XR content based on the images and the detected/tracked objects. Each of the two devices 320, 325 may communicate wirelessly or via a wired connection with a separate controller (not shown) to perform one or more of these functions. Similarly, each of the two devices 320, 325 may store information useful for the XR environment or may communicate with a separate device such as a server or other computing device that stores this information.

In some implementations, a device, such as device 325, is a HMD that is worn by the second user. In some implementations, a device, such as the first device 320 is a handheld electronic device (e.g., a smartphone or a tablet) configured to present the XR environment to the first user. The first device 320 and the second device 325 are each configured to use images or other real-world information detected based on an image sensor(s) or other sensor(s) to provide the XR environment.

In some implementations, the first or second device 320, 325 enable the user to change the viewpoint or otherwise modify or interact with the XR environment. In some implementations, the first or second device 320, 325 are configured to receive user input that interacts with displayed XR content. For example, a virtual object such as a 3D representation of a real-world person or object, or informational displays each with interactive commands may be presented in the XR content. A user may reposition the virtual object or informational displays relative to the depicted real objects or interact with the interactive commands by providing user input on or otherwise using the respective device.

Figure 4:
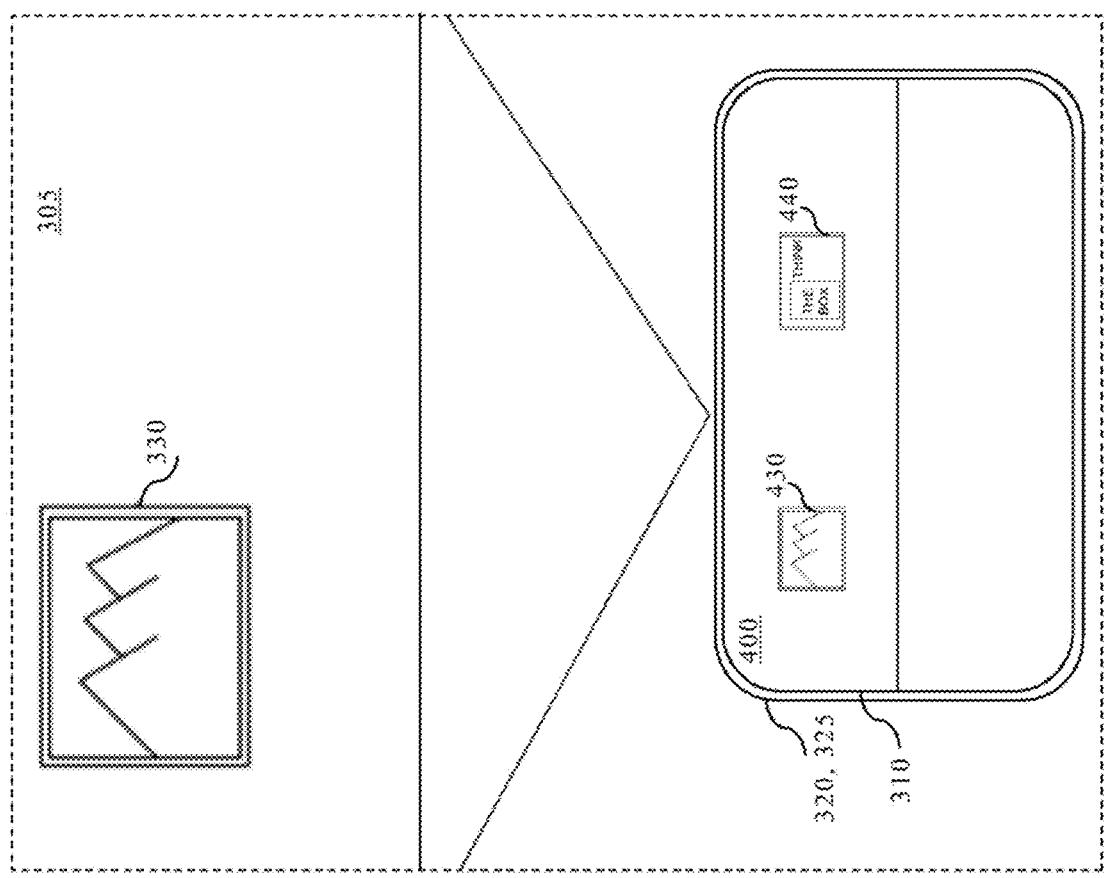
FIG. 4 is a block diagram showing a mobile device capturing a frame of a sequence of frames in the environment of FIG. 3 in accordance with some implementations.

FIG. 4 is a block diagram of the first or second device 320, 325 displaying a XR environment 400 based on the physical environment 305 of FIG. 3 in a display 310 in accordance with some implementations. The XR environment 400 may be generated from a frame of a sequence of frames captured by the first or second device 320, 325, for example, when executing an application in the physical environment 305. As shown in FIG. 4, the first or second device 320, 325 displays XR environment 400 including a depiction 430 of the picture 330 and virtual content 440. In some implementations, the XR environment 400 is shared by the first device 320 and the second device 325.

FIG. 5 is a diagram that shows a XR environment including a 3D representation of a virtual image sensor based on a physical environment in accordance with some implementations. As shown in FIG. 5, a HMD device 525 displays a XR environment 500 based on the physical environment 505 in accordance with some implementations. The XR environment 500 may be generated from a frame of a sequence of frames captured by the HMD 525, for example, when executing an application in the physical environment 505. As shown in FIG. 5, the HMD 525 displays XR environment 500 using a display 510 such as an optical see-through display.

In some implementations, the HMD 525 includes a first configuration of image sensors 545. In some implementations, the first configuration of image sensors 545 includes an array of outward, inward, and/or downward facing image sensors. In some implementations, the array of outward facing image sensors for the HMD 525 provide a 360° view or less than a 360° view around a user 515 of the HMD 525. In some implementations, the array of inward facing image sensors for the HMD 525 provide a view of a face (e.g., gaze direction, facial expressions, physiological characteristics of the eyes, etc.) or a portion of the face of the HMD user 515. In some implementations, the array of downward facing image sensors for the HMD 525 provide a view of the torso, arms, hands, and feet of the HMD user 515.

In some implementations, the HMD 525 executes an application that requests or uses a one or more image sensors (e.g., a front-facing image sensor, rear-facing image sensor, etc.) that is usually available on a smartphone device, a tablet device, or the like. This may occur, for example, when the HMD 525 emulates an application created to be executed on a different device (e.g., smartphone device, a tablet device, or the like) having different sensors or a different sensor configuration than HMD 525. In some implementations, the HMD 525 uses image data from the image sensors 545 to generate an image, a series of images, or a video from a virtual image sensor (e.g., a front or rear-facing image sensor) for the current application executing on the HMD 525. In some implementations, the HMD 525 provides the virtual image sensor feed in the form or format requested by the executing application. Accordingly, in some implementations, the application executing on the HMD 525 is not modified when running on the HMD 525 even though the HMD 525 does not include the requested image sensor (e.g., front-facing image sensor or a rear-facing image sensor). In some implementations, the application executing on the HMD 525 is an image processing application.

In some implementations, the HMD 525 displays to the HMD user 515 a 2D or 3D model of a virtual image sensor of the type requested by the application executing on the HMD 545 in a XR environment. In some implementations, the HMD 525 displays to the HMD user 515 a 2D or 3D model of a complete electronic device that includes a virtual image sensor of the type requested by the application executing on the HMD 545. In some implementations, the HMD 525 displays to the HMD user 515 a 2D/3D model of a virtual object that represents a virtual image sensor of the type requested by the application executing on the HMD 545. For example, HMD 525 may display a 2D or 3D representation of the application containing image data that would be displayed by the application when executed on the intended device. This 2D or 3D representation may be co-located with the virtual image sensor(s) of the type requested by the application.

As shown in FIG. 5, the application executing on the HMD 525 requests image data from a front-facing image sensor of a tablet electronic device. In some implementations, the HMD 525 responds to the requested front-facing image sensor image data of the tablet electronic device by the executing application by modifying image data from the image sensors 545 to implement a virtual front-facing image sensor or image data for a virtual front-facing image sensor. As shown in FIG. 5, the HMD 525 responds to the requested image data by the executing application by displaying to the HMD user 515 a 3D model that is a virtual tablet device 550. In some implementations, the virtual tablet device 550 includes a front-facing image sensor and a rear-facing image sensor presented in a portion of the XR environment 500. As shown in FIG. 5, virtual tablet device 550 includes at least a display 551, a home button 552, a front-facing image sensor 553, a rear-facing image sensor 554, operator controls 555, and input/output ports 556.

In some implementations, the HMD 525 provides a default pose (e.g., position and orientation) for the virtual tablet device 550. In some implementations, the default pose for the virtual tablet device 550 is chest high, 2 feet in front of the HMD user 515. In some implementations, the default pose for the virtual tablet device 550 is based on the application executing on the HMD 525. Accordingly, a default pose for front-facing image sensor image data from the virtual tablet device 550 may be different for a video telephone calling application, a video conferencing application, and a "selfie" application executing on the HMD 525. For example, a default pose for a "selfie" application is a perspective view looking down on the HMD user 515 from a 45° angle.

In some implementations, the HMD user 515 may freely position the virtual tablet device 550 or the virtual front-facing image sensor 553 (e.g., in 3D space) in the XR environment 500. In some implementations, the virtual tablet device 550 is positioned by being co-located with a hand of the HMD user 515. In some implementations, the virtual tablet device 550 is positioned by an action (e.g., gaze) or operator command by the HMD user 515. In some implementations, the virtual tablet device 550 is automatically positioned based on the application currently executing on the HMD 525. In some implementations, the virtual tablet device 550 or a virtual image sensor representation may be automatically controlled (e.g., positioned, orientation, zoom, etc.) so that the face, the shoulders and head, the entire body of the HMD user 515 (e.g., avatar), etc. remains in the field of view (FOV) of the virtual image sensor 553, 554. For example, the virtual image sensor 553 may be automatically controlled so that when the HMD user 515 picks up or holds an object, the virtual image sensor 553 zooms out or is otherwise adjusted to keep the avatar along with the object in the FOV of the virtual image sensor 553.

In some implementations when HMD 525 does have image sensors that capture a view of the user or physical environment as would be viewed by the virtual image sensor 553, the HMD 525 may provide the application with image data containing only virtual content from the XR environment from the perspective of the virtual image sensor 553. In some implementations, the virtual content may include an avatar representation of the user 515. The avatar representation may be generated based on images captured by image sensors of HMD 525, such as inward or downward facing image sensors. In some implementations where HMD 525 does have image sensors that capture a view of the user or physical environment as would be viewed by the virtual image sensor 553, HMD 525 may provide the application with image data generated based on images captured by the image sensors. For example, captured images of the user or the physical environment may be warped using a point of view correction technique to make the images appear as though they were captured using the pose of the virtual image sensor rather than the physical image sensors on HMD 525.

FIG. 6 is a diagram that shows a XR environment including a representation of a virtual image sensor based on a physical environment in accordance with some implementations. In some implementations, the HMD 525 displays to the HMD user 515 a 2D/3D model of an object that represents a virtual image sensor of the type requested by the application executing on the HMD 545. As shown in FIG. 6, the HMD 525 responds to the requested front-facing image sensor feed by the executing application by displaying to the HMD user 515 a 2D image sensor representation 560 that represents a front-facing image sensor in accordance with some implementations.

In some implementations, the 2D image sensor representation 560 representing the virtual image sensor is presented to the HMD user 515 with a corresponding preview 570 (e.g., image, video) so that the HMD user 515 knows or views what the front-facing virtual image sensor represented by the 2D image sensor representation 560 is "seeing". As shown in FIG. 6, the attached preview 570 shows an avatar 575 representing the HMD user 515. In some implementations, the avatar 575 may track facial expressions of the HMD user 515. In some implementations, the avatar 575 is a photo-realistic avatar of the HMD user 515.

Figure 7:
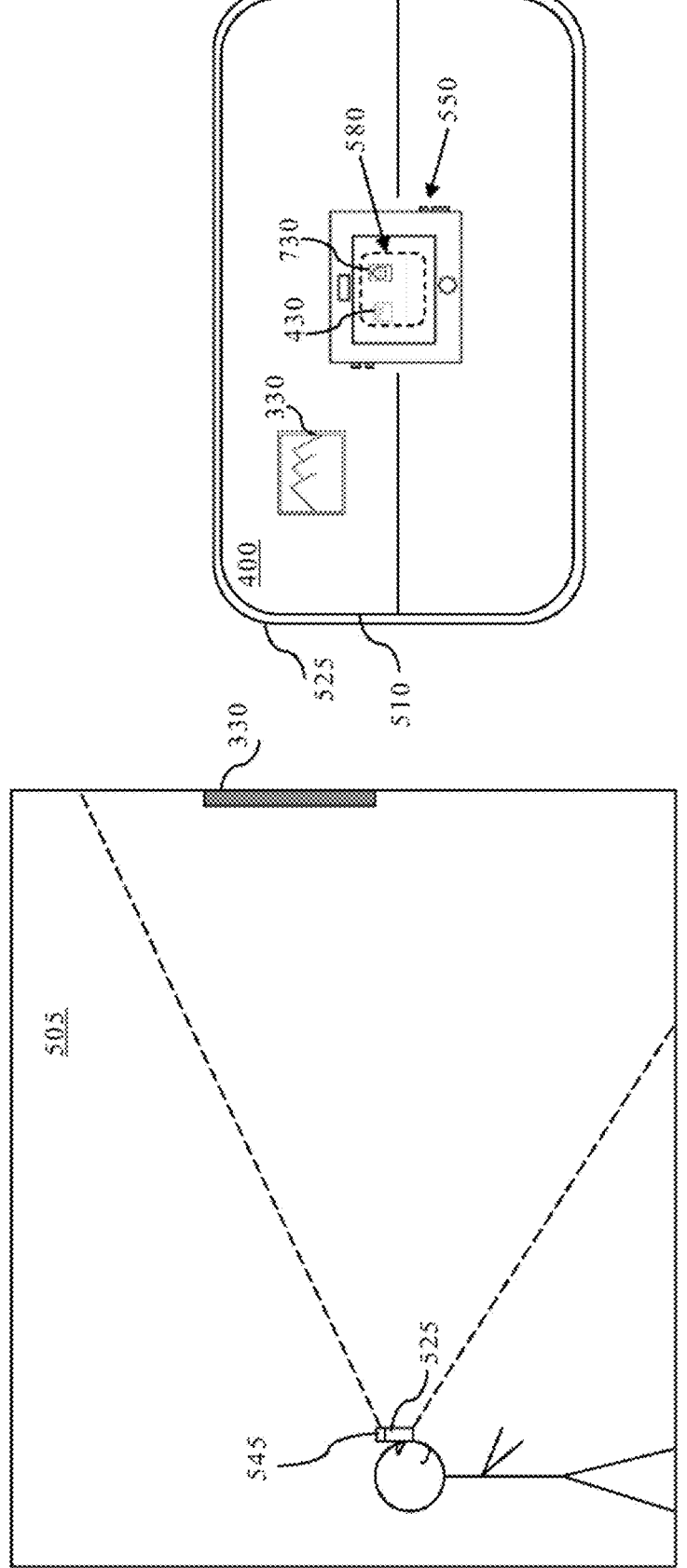

FIG. 7 is a diagram that shows a XR environment including a 3D representation of a virtual image sensor based on a physical environment in accordance with some implementations. As shown in FIG. 7, the HMD device 525 displays a XR environment 500 based on the physical environment 505 that includes the 3D model virtual tablet device 550 including the rear-facing image sensor 554. in accordance with some implementations. As shown in FIG. 7, an application executing on the HMD 525 requests image data for a rear-facing image sensor that is available on a smartphone, a tablet, or the like. In this situation, the HMD 525 provides a virtual rear-facing image sensor 554 view that is a first-person perspective of the HMD user 515 including any virtual content the HMD user 515 sees in accordance with some implementations. Alternatively, in this situation, the HMD 525 provides a virtual rear-facing image sensor feed taken from the position of rear-facing image sensor 554 that shows the opposite direction of the virtual front-facing image sensor 553 (e.g., selfie view of the HMD user's avatar) described above. In some implementations when the application requests image data from the rear-facing image sensor, the HMD 525 may provide the virtual rear-facing image sensor 554 equivalent of a handheld rear-facing image sensor representation in the XR environment 500. In some implementations, the HMD 525 may represent a virtual rear-facing image sensor as a 2D/3D virtual object presented in the XR environment 500 that can be manually or automatically positioned and controlled by the HMD user 515.

In some implementations, the virtual rear-facing image sensor 554 is presented to the HMD user 515 with a corresponding preview 580 (e.g., image, video) so that the HMD user 515 knows or views what the virtual rear-facing image sensor 554 is "seeing". As shown in FIG. 7, the attached preview 580 shows the first-person perspective of the HMD user 515 of the XR environment 550 including the depiction 430 of the picture 330 and virtual object 730 (e.g., picture).

In some implementations when the application requests image data when the rear-facing image sensor is aligned with a ray emanating from the head of the HMD user 515 or from an outward facing image sensor of HMD 525, the HMD 525 may provide a virtual image sensor feed that shows image data or video passthrough. In these implementations, the image data or video passthrough from the outward facing image sensor of HMD 525 may be warped to perform point of view correction to account for the difference in pose between the outward facing image sensor of HMD 525 and the virtual rear-facing image sensor. In some implementations, the virtual image sensor feed may also include virtual content in the XR environment 500 as viewed by the virtual rear-facing image sensor. In some implementations when the application requests the image data when the rear-facing image sensor is not aligned with a ray emanating from the head of the HMD user 515 or from an outward facing image sensor of HMD 525, the HMD 525 may provide a virtual image sensor feed that shows the virtual content in the XR environment 500 as viewed by the virtual rear-facing image sensor. In some implementations when the application requests image data from the virtual rear-facing image sensor, the HMD 525 may limit a pose of the virtual rear-facing image sensor 554 to positions that allow video passthrough.

In some implementations, the HMD 525 downloads an application that request image data from an online or cloud application site or store. In some implementations, the HMD 525 downloads the application from an online or cloud application site and executes the application without modification.

FIG. 8 is a flowchart illustrating an exemplary method of emulating on a head-mounted device (HMD) having a first image sensor in a first image sensor configuration, a second image sensor in a second image sensor configuration different than the first image sensor configuration in accordance with some implementations. In some implementations, the HMD executes an application that requests image data from an image sensor (e.g., a front-facing image sensor or a rear-facing image sensor). In some implementations, the HMD responds to the requests for the image sensor feeds (e.g., front-facing and rear-facing image sensor) by generating image data based on (e.g., modifying the HMD's image sensor data) a virtual image sensor pose. For example, the HMD may emulate a front-facing device image sensor to provide a selfie view of a representation of the HMD user, e.g., a photo-realistic avatar. In another example, the HMD may emulate a rear-facing device image sensor to provide a view of the environment from a position of a virtual image sensor that is a few feet in front of the user and facing away from the user. In some implementations, the method 800 is performed by a device (e.g., electronic device 120, 200 of FIGS. 1-2). The method 800 can be performed using an electronic device or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

As mentioned above, the emulated virtual image sensor may be used to generate image data containing image data captured by a physical image sensor of the HMD, a modified version of the image data captured by the physical image sensor of the HMD, virtual content from a XR environment, or a combination thereof from the perspective of the virtual image sensor based on whether the HMD has image sensors that capture a view of the user or physical environment as would be viewed by the virtual image sensor.

At block 810, the method 800 executes an application on a HMD having a first image sensor in a first image sensor configuration, the application configured for execution on a device including a second image sensor in a second image sensor configuration different than the first image sensor configuration. In some implementations, the HMD executes an application that requests image data from a front-facing or rear-facing image sensor. In some implementations, the HMD does not have a front-facing or rear-facing image sensor, or does not have a front-facing or rear-facing image sensor in a configuration expected by the application. In some implementations, the first image sensor of the HMD includes an array of outward, inward, and downward facing image sensors. In some implementations, the array of outward facing image sensors for the HMD provide a 360° view around the HMD user. In some implementations, the array of outward facing image sensors for the HMD provide or less than a 360° view around the user, such as a 70-90° view in front of the HMD user. In some implementations, the array of inward facing image sensors for the HMD provide a view of a face (e.g., gaze direction, facial expressions, physiological characteristics of the eyes, etc.) or portion of the face of the HMD user. In some implementations, the array of downward facing image sensors for the HMD provide a view of the torso, arms, hands, and feet of the HMD user. In some implementations, at least one processor in the HMD operates to provide the requested image data using sensors on the HMD.

At block 820, the method 800 receives a request from the executing application for image data from the second image sensor in the second image sensor configuration. In some implementations, the HMD receives a request for an image sensor feed from the front-facing image sensor or rear-facing image sensor. In some implementations, the HMD receives a request for an image sensor feed from the front-facing image sensor or rear-facing image sensor of a second electronic device (e.g., a smart phone or tablet). In some implementations, the HMD receives a request for an image sensor feed from the front-facing image sensor or rear-facing image sensor of a second electronic device with the expectation that the second electronic device has a prescribed position with respect the HMD user (e.g., user of the image requesting application). In some implementations, the HMD receives a request for an image sensor feed from the second image sensor including a default position in the physical environment including the HMD.

In some implementations, the second device may be automatically placed (e.g., a default position), positioned as if handheld by the HMD user, or manually positioned by the HMD user. In some implementations, the image sensor feed may be a still image, series of images, video, etc.

At block 830, the method 800 responds to the request by determining a pose of a virtual image sensor. In some implementations, a position and orientation of a virtual image sensor is identified to be 2-3 feet in front of and above the user of the HMD. In some implementations, a position and orientation of the virtual image sensor is identified to be chest high and 2-3 feet in front of the user of the HMD. In some implementations, the position and orientation of a virtual image sensor is pre-determined by the user of the HMD. In some implementations, the position and orientation of a virtual image sensor is determined by the user of the HMD when executing the application. In some implementations, the position and orientation of a virtual image sensor is identified to be on a virtual electronic device, smartphone, tablet, or handheld electronic device displayed by the HMD to the HMD user. In some implementations, the position and orientation of a virtual image sensor is identified by an operator command such as a voice command or gesture. In some implementations, the position and orientation of a virtual image sensor is identified by a current position of the HMD user's extended hand (e.g., right or left hand). In some implementations, the position and orientation of a virtual image sensor is identified to be a position that varies based on the HMD user's movement or actions (e.g., pose of the virtual image sensor changes so that the HMD user remains completely in a FOV of the virtual image sensor). In some implementations, the position and orientation of the virtual image sensor is based on the application or type of application executed at block 810.

At block 830, the method 800 further generates image data based on the pose of the virtual image sensor. In some implementations, the generated image data includes a virtual image that represents an image as if taken from the pose of an image sensor of a virtual device having the second image sensor in the second image sensor configuration. In some implementations, a virtual image is provided as if taken from the pose of an image sensor of the virtual image sensor that is a front-facing image sensor or a rear-facing image sensor. In some implementations, the generated image data simulates optical properties of the second image sensor configuration. In one example, the HMD operates to mimic selfie images captured by the front-facing image sensor of a smartphone, tablet, laptop, or the like. In some implementations, the HMD may not include an image sensor that captures a view of the HMD user or does not capture a view of the HMD user similar to that of a front-facing image sensor of a smartphone, tablet, laptop, or the like. In these implementations, the generated image data may include a virtual representation of the HMD user (e.g., an avatar) as viewed from the perspective of the virtual image sensor. In some implementations, the virtual representation of the HMD user can be generated based on images from inward facing image sensors of the HMD that provide a view of at least a portion of the user's face (e.g., gaze direction, facial expressions, physiological characteristics of the eyes, etc.) to dynamically imitate facial expressions of the user of the HMD. In some implementations, the image data may also include virtual content of the XR environment in which the user is operating as viewed by the virtual image sensor and, if available, image data of the physical environment opposite the HMD user as captured by an image sensor of the HMD (e.g., a rear-facing image sensor if the virtual image sensor is positioned in front of the user). In some implementations, the generated image data (e.g., selfie image) uses the representation of the user of the HMD based on the pose of the virtual image sensor. Then, at block 830, the method 800 provides the generated image data to the executing application.

In some implementations at block 830, the method 800 generates image data based on the pose of the virtual image sensor and image data from the first image sensor. In some implementations, the obtained image data is modified based on the pose of the virtual image sensor to provide the generated image data. In some implementations, modifying the obtained image data includes performing point of view correction based on a pose of the first image sensor and the pose of the virtual image sensor. For example, the image data from the first image sensor may be warped to perform point of view correction to make it appear as though the data from the first image sensor was captured using the determined pose of the virtual image sensor. In some implementations, the first image sensor configuration includes outward, inward, or downward facing image sensors of the HMD. In some implementations, the obtained image data is modified to provide a virtual image as if taken from the pose of image sensor of virtual device having the second image sensor configuration. In some implementations, the obtained image data from the first image sensor is modified to simulate optical properties of the second image sensor configuration. In some implementations, the obtained image data from the first image sensor is modified to account for other operator controller actions such as move up or down, move left or right, zoom in or zoom out, etc. In some implementations, the obtained image data from the first image sensor is modified to account for other information, e.g., zooming out to account for the HMD user grasping an object to ensure both the HMD user and grasped object are in view in the virtual image. In some implementations, the generated image data positions an avatar based on image data from the first image sensor (e.g., the HMD user pose). In some implementations, the generated image data sizes the avatar based on a size of a physical environment. In some implementations, the generated image data is based on an inward facing image sensor or a downward facing images sensor of the first image sensor.

In some implementations, the HMD receives a request for an image sensor feed from the front-facing image sensor or rear-facing image sensor of a second electronic device (e.g., a smart phone or tablet). In some implementations, a virtual representation of the second device may be automatically placed, positioned as if handheld by the HMD user, or manually positioned by the HMD user in a XR environment.

In some implementations, at block 830 the method 800 generates a virtual object that is a 3D model or other representation of the front-facing or rear-facing image sensor of a mobile electronic device such as a smartphone. In some implementations, the 3D model of the front-facing image sensor includes just the image sensor and controls such as image type selections, pose, position adjust, initiate, or scroll operators. In some implementations, the 3D model is an operable 3D representation of an electronic device including the second image sensor in the second image sensor configuration. In some implementations, the 3D model includes the entire tablet device or smartphone device including the front-facing or rear-facing image sensors. For example, the virtual 3D model may replicate the entire tablet or smartphone device in a GGR environment. In some examples, a view of the executed application may be displayed within a virtual display of the virtual object (e.g., virtual smartphone or virtual tablet).

In some implementations, the application is executing in a XR environment. In some implementations, executing the application includes displaying a visual representation of the application, where a pose of a virtual image sensor is based on a pose of the visual representation of the application. For example, the virtual image sensor may be positioned above, below, within, to the side of, etc., of the visual representation of the application.

In some implementations, the generated image data corresponds to the front-facing virtual image sensor that provides a perspective viewpoint of a representation of the user of the HMD.

In some implementations, the HMD further includes sensors that capture audio data while executing the application. In some implementations, the audio data captured by the HMD includes a point source audio data, background audio data, directional audio data, spatialized audio data (e.g., 3D surround sound), etc. In some implementations, the HMD further includes sensors that capture depth data while executing the application. In some implementations, the depth data captured by the HMD corresponds to image data captured by the HMD.

In some implementations, the image processing application includes multiple segments of a communication session with a second device such as video conferencing applications (e.g., multi-user communication applications). In some implementations, the image processing application includes existing video conferencing applications, social media applications, streaming applications, image filtering applications, video telephone calls, etc. In some implementations, the image processing application being operated at the HMD is in a XR environment.

Various implementations disclosed herein include devices, systems, and methods that emulate a second image sensor in a second different image sensor configuration for a second electronic device on a first electronic device having a first image sensor in a first image sensor configuration. In some implementations, the first electronic device is a HMD. In some implementations, the first electronic device is a tablet electronic device or a smartphone electronic device. The first and second image sensor configurations may have image sensors that face different respective directions while in use. In one example, the first image sensor configuration includes an image sensor configured to face a front, rear, down, side, or up direction and the second image sensor configuration has an image sensor configured to face a direction different than the front, rear, down, side, or up direction that the image sensor of the first image sensor configuration is configured to face. In one example, the first image sensor configuration includes an image sensor configured to face front, rear, downward, sideways, or upward from a position while the first device is worn on a head and the second image sensor configuration includes an image sensor configured to face towards a face of a user while a display of the second device is held in hand and viewed. In one example, the first image sensor configuration includes comprise image sensors that cannot capture images of an entire face while the first device is worn on ahead and the second image sensor configuration includes an image sensor configured to capture images of the entire face while the second device is held in hand and viewed.

In some implementations, the image sensor can be an RGB camera, a depth sensor, an RGB-D camera, monochrome cameras, one or more 2D cameras, event cameras, IR cameras, or the like. In some implementations, the image sensor is an outward-facing sensor at the HMD. In some implementations, combinations of sensors are used. In some implementations, the sensor is used to generate a XR environment representing the physical environment. In some implementations, the sensor is used to generate virtual content for the XR environment including the physical environment. In some implementations, color images can be used. Alternatively, in some implementations, grayscale images can be used.

Figure 9:
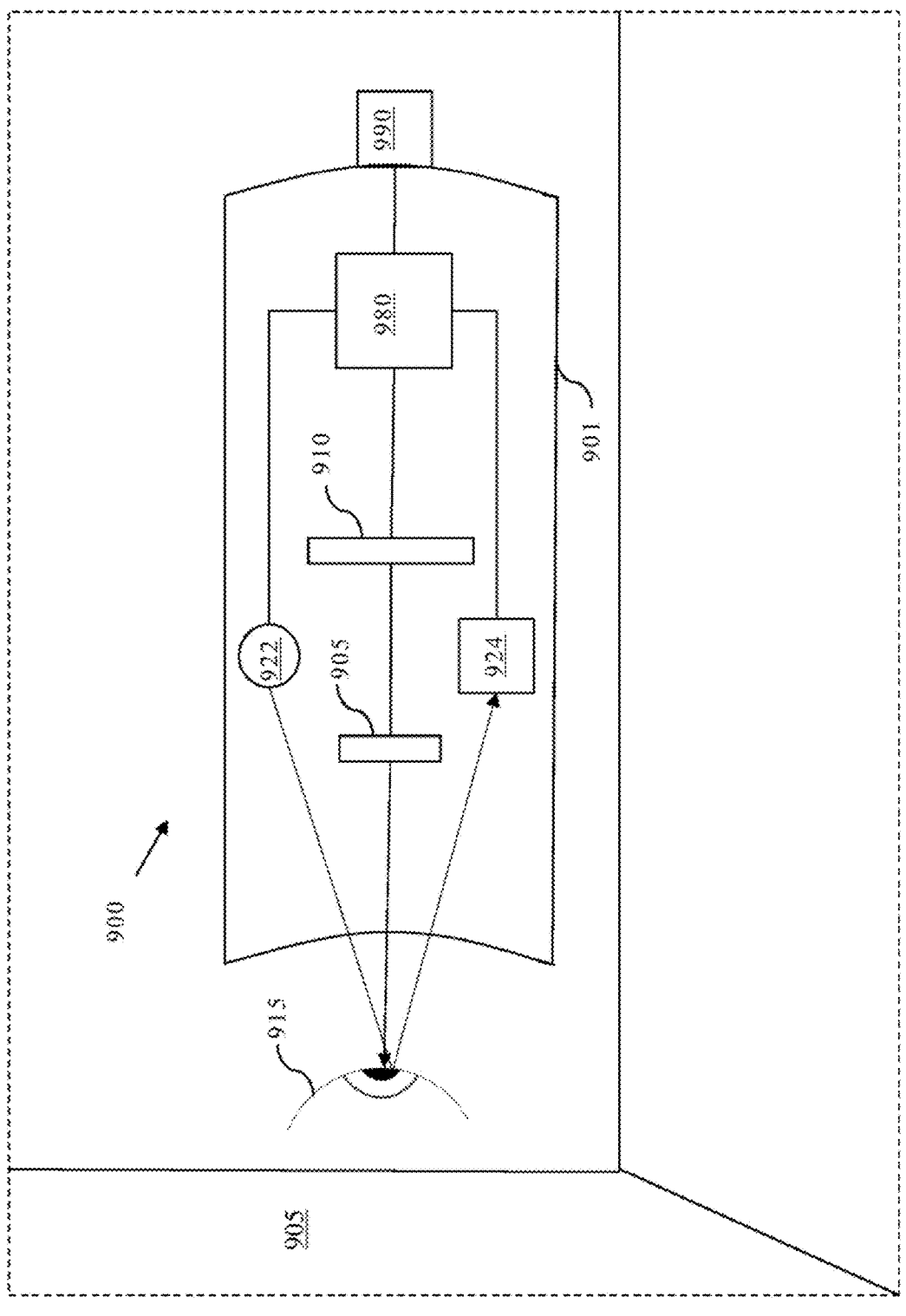
FIG. 9 illustrates a block diagram of an exemplary HMD in accordance with some implementations.

FIG. 9 illustrates a block diagram of an exemplary HMD 900 in accordance with some implementations. In some implementations, the device 900 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 915. Moreover, the illumination source of the device 900 may emit NIR light to illuminate the eyes of the user 915 and the NIR camera may capture images of the eyes of the user 915. In some implementations, images captured by the eye tracking system may be analyzed to detect position and movements of the eyes of the user 915, or to detect a gaze direction of one or both eyes. In some implementations, the eye tracking system may detect other information about the eyes such as blinking (e.g., rate or duration), pupil dilation, or saccadic movements. Moreover, the point of gaze estimated from the eye tracking images may enable gaze-based interaction with content shown on the near-eye display of the device 900.

As shown in FIG. 9, the device 900 includes a housing 901 (or enclosure) that houses various components of the device 900. The housing 901 includes (or is coupled to) an eye pad (not shown) disposed at a proximal (to the user 915) end of the housing 901. In various implementations, the eye pad is a plastic or rubber piece that comfortably and snugly keeps the device 900 in the proper position on the face of the user 915 (e.g., surrounding the eye of the user 915).

The housing 901 houses a display 910 that displays an image, emitting light towards or onto the eye of a user 915. In various implementations, the display 910 emits the light through an eyepiece having one or more lenses 905 that refracts the light emitted by the display 910, making the display appear to the user 915 to be at a virtual distance farther than the actual distance from the eye to the display 910. For the user 915 to be able to focus on the display 910, in various implementations, the virtual distance is at least greater than a minimum focal distance of the eye (e.g., 7 cm). Further, in order to provide a better user experience, in various implementations, the virtual distance is greater than 1 meter.

The housing 901 also houses a tracking system including one or more light sources 922, camera 924, and a controller 980. The one or more light sources 922 emit light onto the eye of the user 915 that reflects as a light pattern (e.g., a circle of glints) that can be detected by the camera 924. Based on the light pattern, the controller 980 can determine an eye tracking characteristic of the user 915. For example, the controller 980 can determine a gaze direction of one or both eyes of the user 915. In another example, the controller 980 can determine a blinking state (eyes open or eyes closed) of the user 915. As yet another example, the controller 980 can determine saccadic movements, a pupil center, a pupil size, or a point of regard. Thus, in various implementations, the light is emitted by the one or more light sources 922, reflects off the eye of the user 915, and is detected by the camera 924. In various implementations, the light from the eye of the user 915 is reflected off a hot mirror or passed through an eyepiece before reaching the camera 924.

The display 910 emits light in a first wavelength range and the one or more light sources 922 emit light in a second wavelength range. Similarly, the camera 924 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In some implementations, eye tracking (or, in particular, a determined gaze direction) is used to track a focal distance of the user 915 (e.g., over time). In some implementations, eye tracking (or, in particular, a determined gaze direction) is also used to enable user interaction (e.g., the user 915 selects an option on the display 910 by looking at it), provide foveated rendering (e.g., present a higher resolution in an area of the display 910 the user 915 is looking at and a lower resolution elsewhere on the display 910), or correct distortions (e.g., for images to be provided on the display 910).

In various implementations, the one or more light sources 922 emit light towards the eye of the user 915 which reflects in the form of a plurality of glints.

In various implementations, the camera 924 is a frame/shutter-based camera that, at a particular point in time or multiple points in time at a frame rate, generates an image of the eye of the user 915. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 924 is an event camera comprising a plurality of light sensors (e.g., a matrix of light sensors) at a plurality of respective locations that, in response to a particular light sensor detecting a change in intensity of light, generates an event message indicating a particular location of the particular light sensor.

In some implementations, the device 900 uses 3D computer vision reconstruction techniques to generate a 3D map of a physical environment 905. In some implementations, the device 900 obtains image(s) of the physical environment 905 using one or more image sensors 990 (e.g., camera or depth sensor). In some implementations, the image is a 2D image or a 3D image. In some implementations, the image sensor 990 is an outward-facing sensor at the device 900. In some implementations, the image sensor 990 can be a RGB camera, a depth sensor, a RGB-D camera, one or more 2D cameras, IR cameras, or the like. In some implementations, combinations of sensors are used. In some implementations, the images are used to generate the 3D map of the physical environment 905 at the device 900. In some implementations, the image sensor 990 is used to generate a XR environment representing at least a portion of the physical environment 905. In some implementations, the XR environment is generated using Visual Inertial Odometry (VIO) or Simultaneous Localization and Mapping (SLAM) position tracking or the like at the device 900. In some implementations, color images can be used. Alternatively, in some implementations, grayscale images can be used.

In some implementations, the device 900 uses a VIO system to track the position of the device 900 in the physical environment. In some implementations, VIO tracks 6 DOF movement of the device 900 in the physical environment 905 (e.g., 3 DOF of spatial (xyz) motion (translation), and 3 DOF of angular (pitch/yaw/roll) motion (rotation) in real-time. In some implementations, VIO recalculates or updates the position of the electronic device position in the physical environment 905 in-between every frame refresh on a display of the device 900. For example, VIO recalculates the device 900 position 10, 30, or 60 or more times a second. In some implementations, VIO tracks the position using a visual sensor (e.g., camera system) by matching a point in the real world to a pixel on the image sensor in each frame and using an inertial system (e.g., accelerometer and gyroscope, inertial measurement unit (IMU), etc.). In some implementations, VIO tracks the distance that the device 900 traveled in the physical environment 905. In some implementations, VIO is implemented by a software development kit providing a XR development platform for electronic devices. In some implementations, VIO generates and updates the 3D map for the physical environment 905.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a processor:

executing an application on a device having a first image sensor in a first image sensor configuration, the application configured for execution on a device comprising a second image sensor in a second image sensor configuration different than the first image sensor configuration;

receiving a request from the executing application for image data from the second image sensor in the second image sensor configuration; and responsive to the request, determining a pose of a virtual image sensor;

generating image data based on the pose of the virtual image sensor and image data from the first image sensor; and providing the generated image data to the executing application.

2. The method of claim 1, wherein generating image data comprises:

modifying the image data from the first image sensor based on the pose of the virtual image sensor to provide the generated image data.

3. The method of claim 2, wherein modifying the obtained image data comprises performing point of view correction based on a pose of the first image sensor and the pose of the virtual image sensor.

4. The method of claim 1, wherein the generated image data simulates optical properties of the second image sensor.

5. The method of claim 1, wherein generating image data comprises generating an avatar based on the image data from the first image sensor.

6. The method of claim 5, further comprising sizing the avatar based on a size of a physical environment in which the device having the first image sensor is operating.

7. The method of claim 1, wherein the first image sensor comprises an inward facing image sensor or a downward facing image sensor.

8. The method of claim 1, further comprising:

presenting user selectable input controls in a 3D representation of the second image sensor in the second image sensor configuration.

9. The method of claim 1, further comprising:

presenting an operable 3D representation of an electronic device comprising the second image sensor in the second image sensor configuration.

10. The method of claim 9, further comprising:

generating a preview image of the generated image data near the 3D representation of the electronic device.

11. The method of claim 9, further comprising:

generating a preview image of the generated image data on the 3D representation of the electronic device.

12. The method of claim 1, wherein the second image sensor comprises a front-facing image sensor or a rear-facing image sensor.

13. The method of claim 1, wherein the second image sensor comprises a front-facing image sensor, and wherein generating image data comprises generating an avatar based on the image data from the first image sensor.

14. The method of claim 1, wherein the second image sensor comprises a rear-facing image sensor, and wherein generating image data comprises modifying the image data from the first image sensor based on the pose of the virtual image sensor to provide the generated image data.

15. The method of claim 1, wherein the application is executing in an extended reality (XR) environment.

16. The method of claim 15, wherein the generated image data comprises a virtual object from the XR environment as viewed by the virtual image sensor.

17. The method of claim 1, wherein executing the application comprises presenting a visual representation of the application, and wherein the pose of the virtual image sensor is based on a pose of the visual representation of the application.

18. The method of claim 1, wherein the request from the executing application for image data comprises a request for depth data.

19. The method of claim 1, further comprising receiving a request from the executing application for audio data.

20. The method of claim 1, wherein the executing application is an image processing application providing multiple segments of a communication session with a second device.

21. The method of claim 1, wherein the generated image data provides a perspective viewpoint of a user of the device having the first image sensor.

22. The method of claim 21, wherein the perspective viewpoint of the user of the device having the first image sensor comprises an avatar that dynamically imitates facial expressions of the user of the device having the first image sensor based on the image data from the first image sensor.

23. The method of claim 1, wherein the device having the first image sensor is a head-mounted device (HMD).

24. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

executing an application on a head-mounted device (HMD) having a first image sensor in a first image sensor configuration, the application configured for execution on a device comprising a second image sensor in a second image sensor configuration different than the first image sensor configuration;

receiving a request from the executing application for image data from the second image sensor in the second image sensor configuration; and responsive to the request, determining a pose of a virtual image sensor;

generating image data based on the pose of the virtual image sensor and image data from the first image sensor; and providing the generated image data to the executing application.

25. A non-transitory computer-readable storage medium, storing program instructions computer-executable on a computer to perform operations comprising:

executing an application on a head-mounted device (HMD) having a first image sensor in a first image sensor configuration, the application configured for execution on a device comprising a second image sensor in a second image sensor configuration different than the first image sensor configuration;

receiving a request from the executing application for image data from the second image sensor in the second image sensor configuration; and responsive to the request, determining a pose of a virtual image sensor;

generating image data based on the pose of the virtual image sensor and image data from the first image sensor; and providing the generated image data to the executing application.

* * * * *